United States Patent [19]
Cheng et al.

[11] Patent Number: 5,592,531
[45] Date of Patent: Jan. 7, 1997

[54] SELECTIVE CALL COMMUNICATION SYSTEM HAVING ADAPTIVE VOICE DATA ENTRY

[75] Inventors: Yan M. Cheng, Lake Worth; Lu Chang, Boca Raton, both of Fla.

[73] Assignee: Motorola, Inc., Schaumburg, Ill.

[21] Appl. No.: 415,288

[22] Filed: Apr. 3, 1995

[51] Int. Cl.$^6$ .................... H04Q 7/06; H04Q 7/08
[52] U.S. Cl. .................... 379/57; 379/56; 379/58
[58] Field of Search .................... 379/57, 58, 59, 379/60, 61, 67, 88, 89, 201, 210, 211, 212, 130, 131, 142

[56] References Cited

U.S. PATENT DOCUMENTS

| | | | |
|---|---|---|---|
| 4,924,496 | 5/1990 | Figa et al. | 379/142 |
| 4,942,598 | 7/1990 | Davis | 379/57 |
| 5,138,311 | 8/1992 | Weinberg . | |
| 5,369,685 | 11/1994 | Kero | 379/67 |
| 5,452,340 | 9/1995 | Engelbeck et al. | 379/67 |
| 5,479,488 | 12/1995 | Lennig et al. | 379/67 |

FOREIGN PATENT DOCUMENTS

| | | |
|---|---|---|
| 0041195 | 12/1981 | European Pat. Off. . |
| 504226 | 12/1989 | European Pat. Off. . |
| 63-273016 | 5/1990 | Japan . |

OTHER PUBLICATIONS

Networking "Telephony gets an improved interface" By Doug Barney, Mar. 6, 1995 INFOWORLD pp. 45.

*Primary Examiner*—Curtis Kuntz
*Assistant Examiner*—Nay Aung Maung
*Attorney, Agent, or Firm*—Keith A. Chanroo

[57] ABSTRACT

A selective call communication system (100), such as a paging system (100), and a method therefor, for using a lexicon (134) for voice data entry in the selective call communication system (100) is shown. The system (100) associates a Voice User ID (206) to a subscriber ID (202) for one or more subscribers of the system (100). The system (100) accumulates user system statistics (208). Then, based on the accumulated user system statistics (208), the system (100) defines a lexicon (134) to include at least one Voice User ID (206) for the one or more subscribers for voice data entry for the system (100).

7 Claims, 4 Drawing Sheets

| 202 | 204 | 206 | 208 |
|---|---|---|---|
| SUBSCRIBER ID | PAGER ADDRESS | VOICE USER ID | USER SYSTEM STATISTICS |
| 12345 | 775566 | "BILL" | 19 |
| ⋮ | ⋮ | ⋮ | ⋮ |
| 12378 | 978811 | "MARY" | 2 |
| ⋮ | ⋮ | ⋮ | ⋮ |
FIG. 2   132
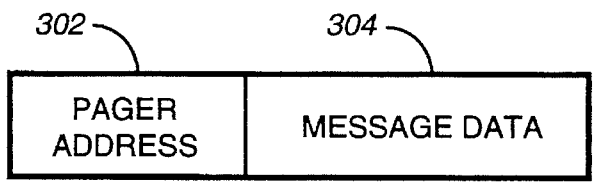
FIG. 3
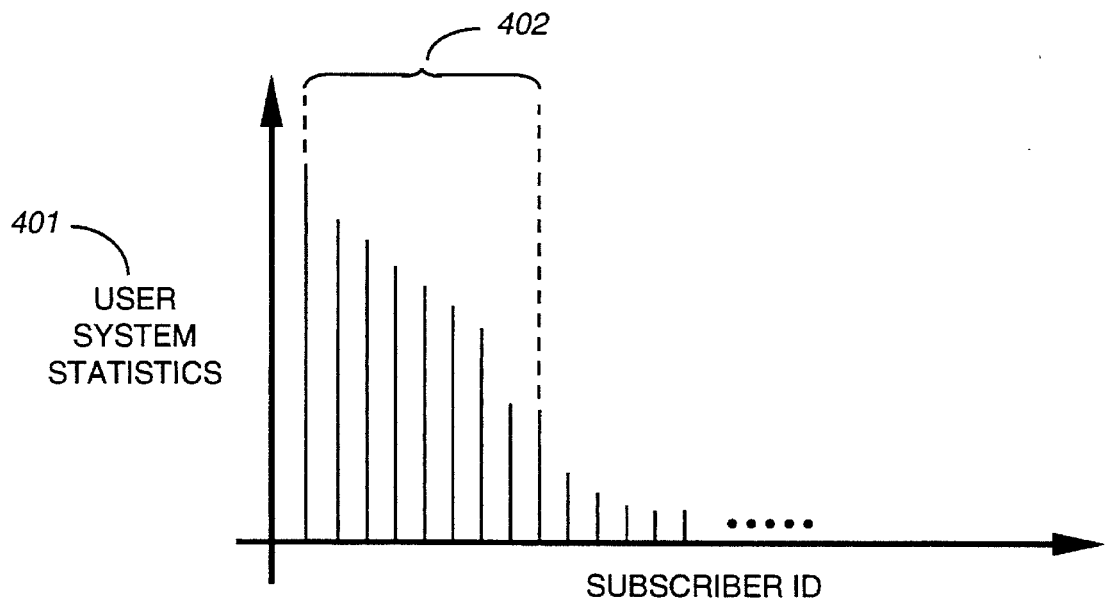
FIG. 4

SELECTIVE CALL COMMUNICATION SYSTEM HAVING ADAPTIVE VOICE DATA ENTRY

FIELD OF THE INVENTION

This invention relates in general to selective call communication systems and more specifically to a method for providing voice data entry therein.

BACKGROUND OF THE INVENTION

Conventional selective call communication systems, e.g., paging systems, receive incoming calls from callers requesting to send messages to selected recipients. Callers typically enter their requests into the system in one of the following three ways. First, callers may use their telephones to provide DTMF signaling into the system to enter their selective messages. Secondly, callers may use a computer with modem to provide modem communication over telephone lines to enter their selective messages into the system. Thirdly, callers may simply speak their requests to human operators that answer the telephones at a message reception console. These operators then enter the information directly into the system, such as by using keyboard entry, for communicating the messages to the selected recipients.

These conventional methods have certain disadvantages. For example, in the first case, a caller may have to memorize a relatively long user identification number (or PIN) for each requested recipient of a message through the system. This can be a cumbersome procedure. In the second case, a caller utilizes a computing device and modem to perform modem communication over telephone line with a system. Callers may not have ready access to computers with modems for communicating with the system. Further, requiring callers to have a computer and modem for communicating messages to the system imposes an economic burden on them. Additionally, requiring callers to carry the devices on their person to effect messaging can pose a logistical problem. In the third case, having a large group of operators receiving messages from callers and entering the information directly into the system can add significant costs to a system as well as can delay the overall entry process. This will adversely impact the commercial viability of the communication system.

Thus, what is necessary is a new method and apparatus allowing callers to enter their requests into a communication system, such as a paging system, in a user friendly, fast and efficient manner, and without the aforementioned disadvantages.

BRIEF DESCRIPTION OF THE DRAWINGS

FIG. 2 illustrates an exemplary database organized for subscribers of the selective call communication system of FIG. 1, according to a preferred embodiment of the present invention.

FIG. 3 is a message block diagram illustrating an exemplary message for the selective call communication system of FIG. 1, in accordance with a preferred embodiment of the present invention.

FIG. 4 is a graph illustrating a rank ordering of subscribers of a system based on user system statistics in accordance with a preferred embodiment of the present invention.

DESCRIPTION OF THE PREFERRED EMBODIMENTS

Figure 1:
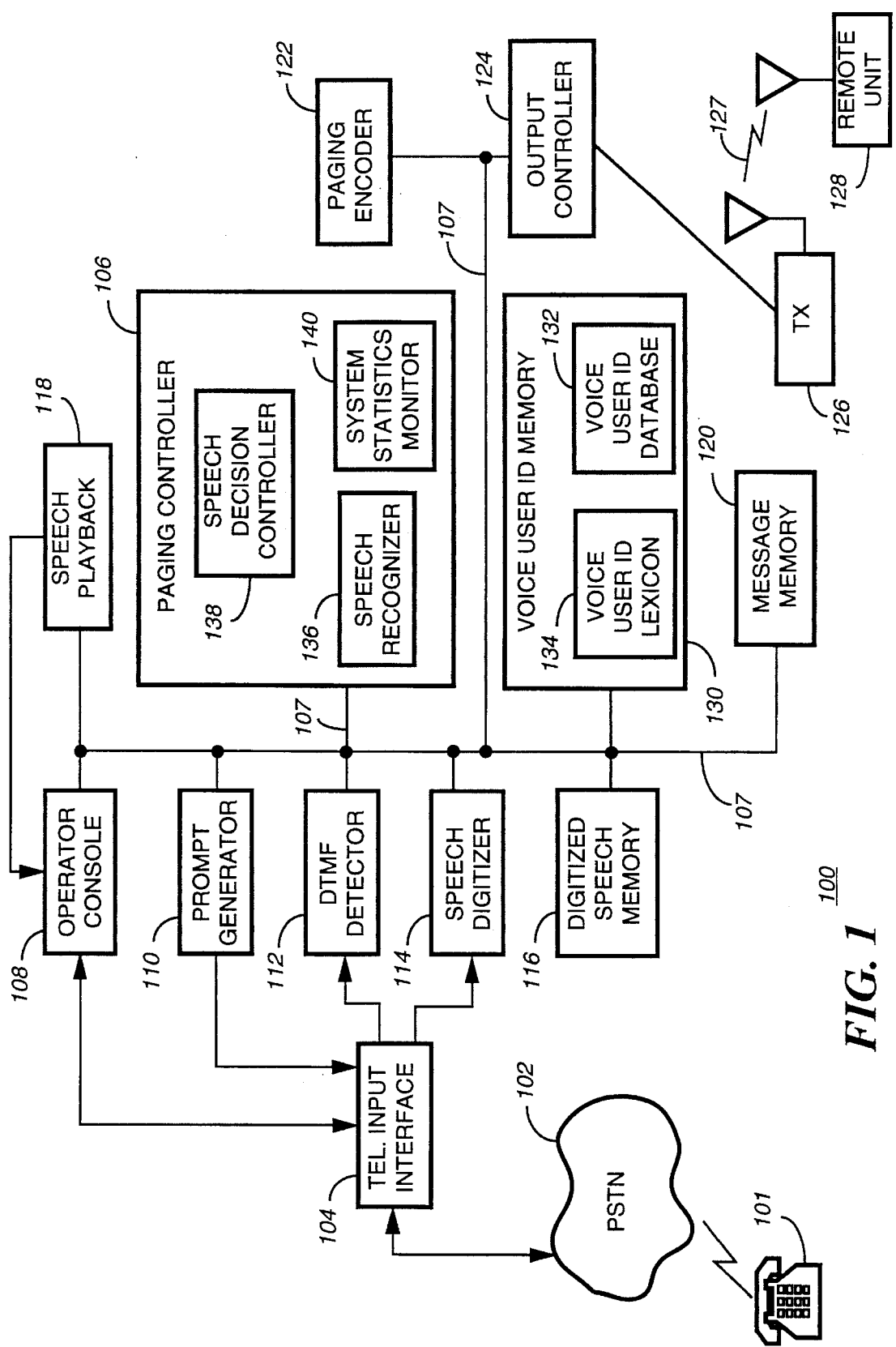
FIG. 1 is an electrical block diagram of a selective call communication system in accordance with a preferred embodiment of the present invention.

FIG. 1 shows an exemplary selective call communication system, e.g., an exemplary paging system, according to a preferred embodiment of the present invention. The general operation of a communication system of the type shown in FIG. 1 is described in U.S. Pat. No. 5,138,311, issued Aug. 11, 1992, entitled, "Communication System Having Adaptable Message Information Formats", which is assigned to the same assignee as the present invention and is incorporated herein by reference. A telephone caller 101 accesses a telephone input interface 104, e.g., a paging input 104, of the selective call communication system 100 via the public switched telephone network (PSTN) 102. Once the caller 101 connects with the telephone input interface 104 of the system 100, the caller 101 can access functions of the communication system 100 which are controlled by a controller 106. The controller 106 communicates via a bus 107 to other components of the system 100. An operator console 108 allows a system operator to communicate through the console 108 with the controller 106. The system operator can also connect directly with the telephone input interface 104 to speak with a caller 101, if necessary.

A prompt generator 110 provides prompts to the telephone interface 104 which are then coupled to a telephone caller 101. A prompt can be a tone or a series of tones. It can alternatively be a synthesized voice prompt that is coupled to the caller 101. In a third alternative, a prompt can be a model communication sequence. The prompt generator 110 provides signaling to the caller 101 to generally guide the caller through an input sequence.

A detector 112 can detect incoming DTMF signaling from a caller 101. Optionally, the detector 112 can include a modem signaling detector to receive modem communication from a caller 101.

A speech digitizer 114 receives and digitizes incoming speech from the caller 101. A digitized speech memory 116 stores the digitized speech from the speech digitizer 114. A speech playback unit 118 can play back the digitized speech stored in the digitized speech memory 116 and couple the playback audio to the operator console 108 to allow a system operator to hear the speech that was recorded and stored in the memory 116. A message memory 120 stores the incoming messages from callers 101. A paging encoder 122 encodes the messages into selective call communication protocols, such as the POCSAG protocol or Motorola's FLEX protocol. An output controller 124 couples the encoded messages to one or more transmitter base stations 126 which can then deliver the messages over a communication channel 127 to one or more remote units 128. These remote units 128 are capable of selectively receiving messages that are addressed to specific remote units 128, such as paging receivers. The operation of paging receivers of the general type shown in FIG. 1 is well known and is more fully described in U.S. Pat. No. 4,518,961 issued May 21, 1985, entitled "Universal Paging Device With Power Conversation", which is assigned to the same assignee as the present invention and is incorporated herein by reference.

In the preferred embodiment, subscribers of the communication system 100 are identified by a subscriber ID (or a subscriber PIN) which can be entered by a caller 101 while entering a request into the system 100 to selectively send a message to the identified subscriber. The subscriber ID can be entered into the system 100 by a caller 101 by using the detector 112, such as by using DTMF signaling or optionally using modem signaling.

Alternatively, in the preferred embodiment, the caller 101 is capable of speaking a Voice User ID into the communication system 100. The Voice User ID is associated with the subscriber ID such that a caller 101 can simply speak through the telephone input interface 104 into the system 100 to select a particular subscriber as the recipient of a message. To effect this selection, the system 100 can utilize voice recognition technology to reliably determine that a particular subscriber ID has been selected from an incoming voice data from a caller 101.

To perform voice recognition on an incoming voice data from a caller 101, the system 100 utilizes a Voice User ID lexicon 134 which is located in a Voice User ID memory 130. This will also be called a lexicon 134 or a lexicon memory 134. The lexicon 134 provides a selection of possible Voice User ID's available in the system 100 to match an incoming voice data from a caller 101. A Voice User ID database 132 stores in Voice User ID memory 130 information for subscribers of the system 100 that can be selected using voice recognition. This will also be called a database 132 or a database memory 132. The lexicon 134 maintains a current selection of Voice User ID's for possible matching with an incoming voice data from a caller 101, while the Voice User ID database 132 maintains comprehensive information for all users that can be selected via voice recognition. The Voice User ID database 132 will be more fully discussed below.

The controller 106 comprises a speech recognizer 136 which provides a voice recognition engine to implement the voice recognition selection of one of the Voice User ID's in the lexicon 134 with respect to the incoming voice data from the caller 101. The speech recognizer 136 compares the incoming voice data from a caller 101, after having been digitized by the speech digitizer 114 and stored in the memory 116, to the available Voice User ID's in the lexicon 134. The speech recognizer 136 typically provides a series of probability results which identify the likelihood that any one of the Voice User ID's in the lexicon 134 would be a likely match to the "unknown" incoming voice data.

The controller 106 further comprises a speech decision controller 138. The speech decision controller 138 utilizes the probability information results from the speech recognizer 136 to make a decision with respect to an incoming voice data to determine whether there is a match to one of the available Voice User ID's in the lexicon 134.

The controller 106 also comprises a system statistics monitor 140. The system statistics monitor 140 keeps track of system statistics that are a basis for maintaining a vocabulary of Voice User ID's in the lexicon 134, as will be discussed more fully below. By monitoring the system statistics, the monitor 140 can maintain in the lexicon 134 those Voice User ID's which are most likely to be selected by a caller 101.

Typically, a small subset of the total number of subscribers to the system 100 is active during any particular time interval. That is, for example, 10% of subscribers in the communication system 100 are likely to be actively receiving messages at any particular time. By utilizing this characteristic of the system 100, the monitor 140 can maintain a small subset, e.g., approximately 10%, of the total number of Voice User ID's in the lexicon 134. The system 100 therefore adapts a voice recognition function according to an updating lexicon 134 based on changing user system statistics.

The speech recognizer 136 compares an incoming "unknown" voice data to a reduced set of potentially matching Voice User ID's in the lexicon 134, which is smaller than the total population of subscribers for the system 100. By comparing to the smaller lexicon 134, the system 100 tends to increase its voice recognition accuracy thereby making more accurate recognitions of "unknown" incoming voice data. This enhances the overall call processing efficiency of the system 100 by successfully handling incoming requests in an automated process. Furthermore, by comparing against the smaller lexicon the system 100 reduces the amount of time necessary to recognize an "unknown" incoming voice data. By handling each call faster and more reliably, the preferred embodiments of this invention enhance the overall system's call handling efficiency and consequently its commercial viability.

The system statistics monitor 140 can maintain different types of statistics information for the subscribers of the system 100. These statistics, in the preferred embodiment, are maintained in the database 132. As discussed above, typically 10% of the total subscribers to a system 100 are active at any particular time. Another way of stating this system activity is that over a predetermined time interval approximately 10% or less of the subscribers of the system 100 will receive approximately 95% or more of the messages. For example, in a 10,000 subscriber system 100 this would mean that only approximately 1000 Voice User ID's at any particular point in time would be likely candidates for recognition against an incoming voice data from a caller 101. Therefore, the monitor 140, in a preferred embodiment of the present invention, maintains system statistics for the subscribers of the system 100 in the Voice User ID database 132 to be able to identify a subset of the total subscriber population that is likely to be a recipient of an incoming message request, as will be more fully discussed below.

Referring to FIG. 2, the database 132 is preferably organized for each subscriber of the system 100 to associate a subscriber ID 202 with a pager address 204 and a Voice User ID 206 and a user system statistics 208. For example, in FIG. 2, the subscriber ID "12345" is associated with pager address "775566". The pager address 204 selects a particular recipient of a message in the system 100. That is, a pager address 204 is coupled with a message data to provide a message that is sent to a selective call receiver 128 (FIG. 1). An example of a selective call message is illustrated in FIG. 3. There, a pager address information 302 is coupled to a message data 304 to form a message which can be transmitted from the system 100 over the communication channel 127 to select one or more remote units 128. The one or more selected remote units 128 would then receive the message and extract the message data 304. Referring back to FIG. 2, the subscriber ID "12345" is associated with a Voice User ID 206 representing the speech for the name "Bill." Furthermore, the subscriber ID 202 number "12345" is associated with a user system statistics 208 which, for this example, is accumulated to a number "19" over a predetermined time interval. A second exemplary subscriber in the database 132 is identified by the name "Mary", and has the associated database information as shown. Mary's user system statistics 208 have accumulated to a number "2" over the predetermined time interval, which, for this example, is a much smaller number than Bill's user system statistics 208. Therefore, in this example, the system 100 could designate Bill as an active subscriber while it could designate Mary as an inactive subscriber during the predetermined time interval.

One way of maintaining user system statistics 208 in the database 132 is for the monitor 140 to accumulate the number of messages that have been requested to be sent to a particular subscriber over a predetermined time interval and maintain that statistic for that subscriber's record in the database 132 as illustrated in FIG. 2. After a predetermine time interval has elapsed the monitor 140 can determine from the user system statistics 208 in the database 132 which Voice User IDs should be included in the lexicon 134.

For example, referring to FIG. 4, the monitor 140 can rank order subscriber IDs 400 with respect to user system statistics 401. The ranking shown is from highest usage to lowest usage. The monitor 140 could group those subscriber IDs 400 that provide approximately 95% of the total system usage for a predetermined time interval. This group 402 comprises a set of the most likely recipients of an incoming message request and their Voice User IDs would be made available through the lexicon 134 for comparison against an "unknown" incoming voice data from a caller 101. The monitor 140 can periodically perform the ranking and grouping functions to adapt a voice recognition function for the system 100 according to an updating lexicon 134 based on the changing user system statistics.

A further refinement of the grouping process discussed above is to limit the size of the group 402 to the smaller of the number of subscribers providing approximately 95% of the activity in the system 100 or to 10% of the total number of subscribers in the system 100. In this way, the size of the group 402 would be limited to less than or equal to 10% of the total number of subscribers in the system 100. The percentages used above are for exemplary purposes only, and other percentages may be useful in accordance with the particular applications.

Additional refinements to the method utilized by the monitor 140 can customize system performance for particular situations. For example, the monitor 140 can maintain a predetermined usage profile for predetermined time intervals for subscribers of the system 100. During these predetermined time intervals specific subscribers could have defined their profiles to high or low likelihood of usage. A designation of high likelihood of usage would increase a subscriber's priority to be included in the lexicon 134. On the other hand, a subscriber's usage profile designating a low likelihood of usage for a predetermined time interval would lower the subscriber's priority for inclusion in the lexicon 134. This usage profile information, therefore, can provide another basis for the system 100 to determine whether to include a subscriber's Voice User IDs in the lexicon 134.

Additionally, subscribers could be individually assigned a priority for messaging that could be utilized as a system statistic for determining whether their particular Voice User ID should be included in the lexicon 134. For example, certain users could either pay a higher usage fee to be assigned high priority service, or they could be designated as emergency message recipients which would entitle them to high priority processing of message requests. Further, certain types of messaging may be more likely at certain times and less likely at other time intervals. Hence, during a particular time interval those subscribers utilizing the certain types of messaging may be more likely to receive messages and would be accorded a higher priority for being included in the lexicon 134. Therefore, as discussed above, a number of different types of system statistics can be monitored by the monitor 140 for the subscribers of the system 100 to determine which Voice User IDs to include in the Voice User ID lexicon 134.

In a preferred embodiment of the present invention, when a caller 101 provides a voice data into the system 100, as discussed before, the speech digitizer 114 digitizes the voice data and stores it in the speech memory 116. The speech recognizer 136 compares the digitized voice data from the memory 116 to all the candidate Voice User ID's in the lexicon 134. Each of the Voice User ID's in the lexicon 134 is assigned a probability of a match to the "unknown" voice data from the memory 116. The speech decision controller 138 will determine from all the probabilities assigned by the speech recognizer 136 whether there is a likely match to one of the Voice User ID's in the lexicon 134.

If a match is found, the speech decision controller 138 selects the subscriber ID 202 (FIG. 2) from the database 132 that is associated with a particular Voice User ID 206 that matched the voice data from the caller 101. Subsequently, the system 100 can prompt the caller 101, such as by using the prompt generator 110, to enter a message data. A message, including pager address 204 coupled to the message data, is then stored in the message memory 120. As discussed earlier, the paging encoder 122 retrieves a message from the message memory 120 and provides an encoded message to the output controller 124 which then couples the message to one or more transmitting base stations 126. The message is transmitted over a communication channel 127 for reception by one or more remote units 128, such as by one or more remote paging receivers.

On the other hand, if the speech decision controller 138 cannot determine a likely match to any one of the Voice User ID's in the lexicon 134, then the controller 106 can alert a system operator through the operator console 108 and can route the voice data from the memory 116 to the speech playback unit 118 to allow the system operator to hear the caller's digitized speech. If the system operator can understand the caller's selection then the system operator through the console 108 can enter the subscriber ID information and provide that information to the controller 106.

For example, the system operator after hearing the playback, can effect a lookup function by the controller 106 on the database 132 to determine if there is a match to one of the records in the database 132. This can be accomplished, for example, by the operator inputting a lookup request at a user interface, e.g., a keyboard, at the console 108. A video display at the console 108 would display the result of the lookup function. The system operator through the console 108 can then communicate the selected subscriber ID to the controller 106. This lookup process can be accomplished quickly while the caller 101 remains on the line waiting for a decision. Therefore, the system operator could perform the lookup procedure without inconveniencing the caller 101.

However, if the system operator is not able to find a match in the database 132, then the system operator can override the controller 106 and switch in an audio path with the telephone input interface 104 to directly communicate with the caller 101 and manually process the caller's request. This normally would be a last resort. Typically, the caller's request would be processed automatically by the system 100, without requiring intervention by a system operator. Therefore, the operation of this system 100 would normally be fast and efficient, and with minimal inconvenience to a caller 101. This enhances the commercial viability of the system 100.

Figure 5:
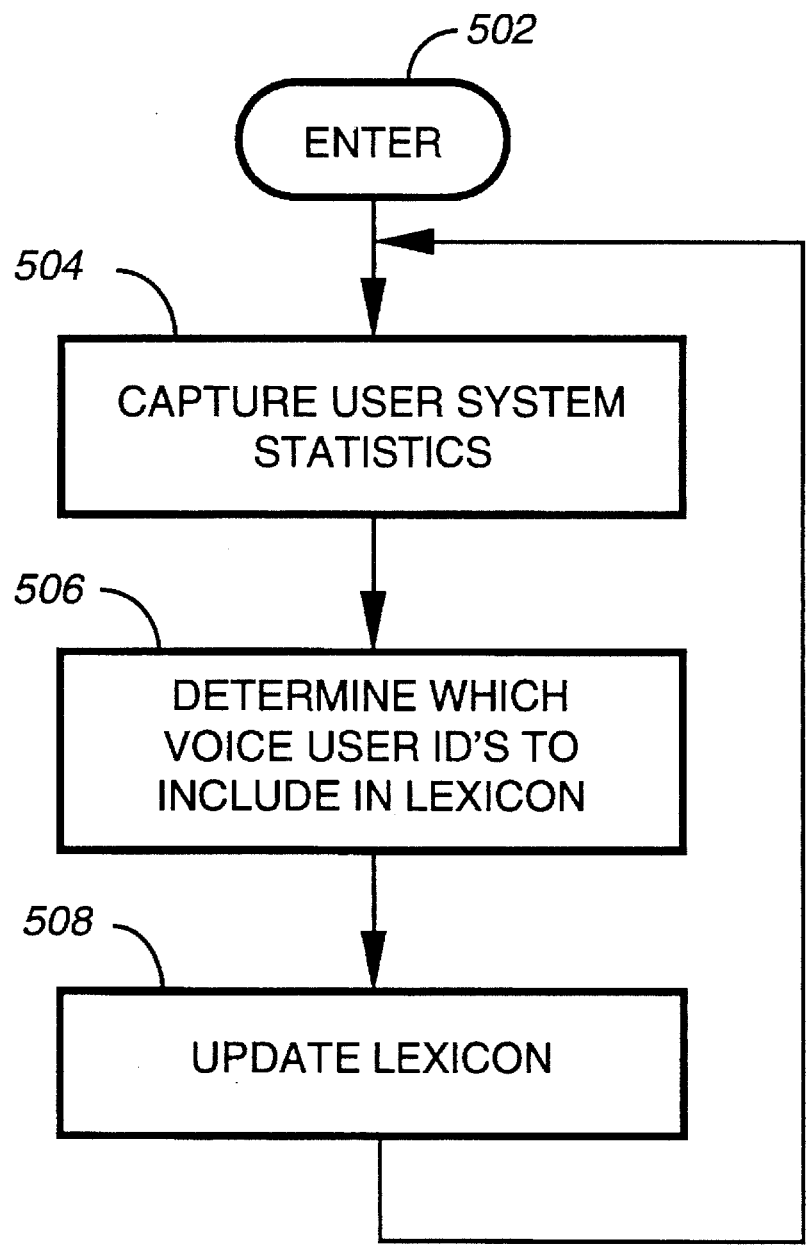
FIG. 5 is a flow diagram illustrating a first operation of the selective call terminal in FIG. 1, in accordance with a preferred embodiment of the present invention.

Referring to FIG. 5, a flow diagram illustrates an exemplary process for the controller 106 for adapting a voice recognition function for the system 100 by updating the lexicon 134 according to the changing user system statistics. Specifically, after initialization 502, the monitor 140 captures 504 user system statistics, as discussed earlier, and stores them in the database 132. The monitor 140, after a predetermined time interval, determines 506 which of the Voice User IDs to include in the lexicon 134. The monitor 140 then updates the lexicon 134 to correspond to the Voice User IDs included therein. In a preferred embodiment, as discussed earlier, the lexicon 134 can be updated to maintain the Voice User IDs for the top 10% most active subscribers during the predetermined time interval. The monitor 140 can determine the Voice User IDs to include in the lexicon 134 and periodically update the lexicon 134 to adapt a voice recognition function for the system 100 according to changing user system statistics.

Figure 6:
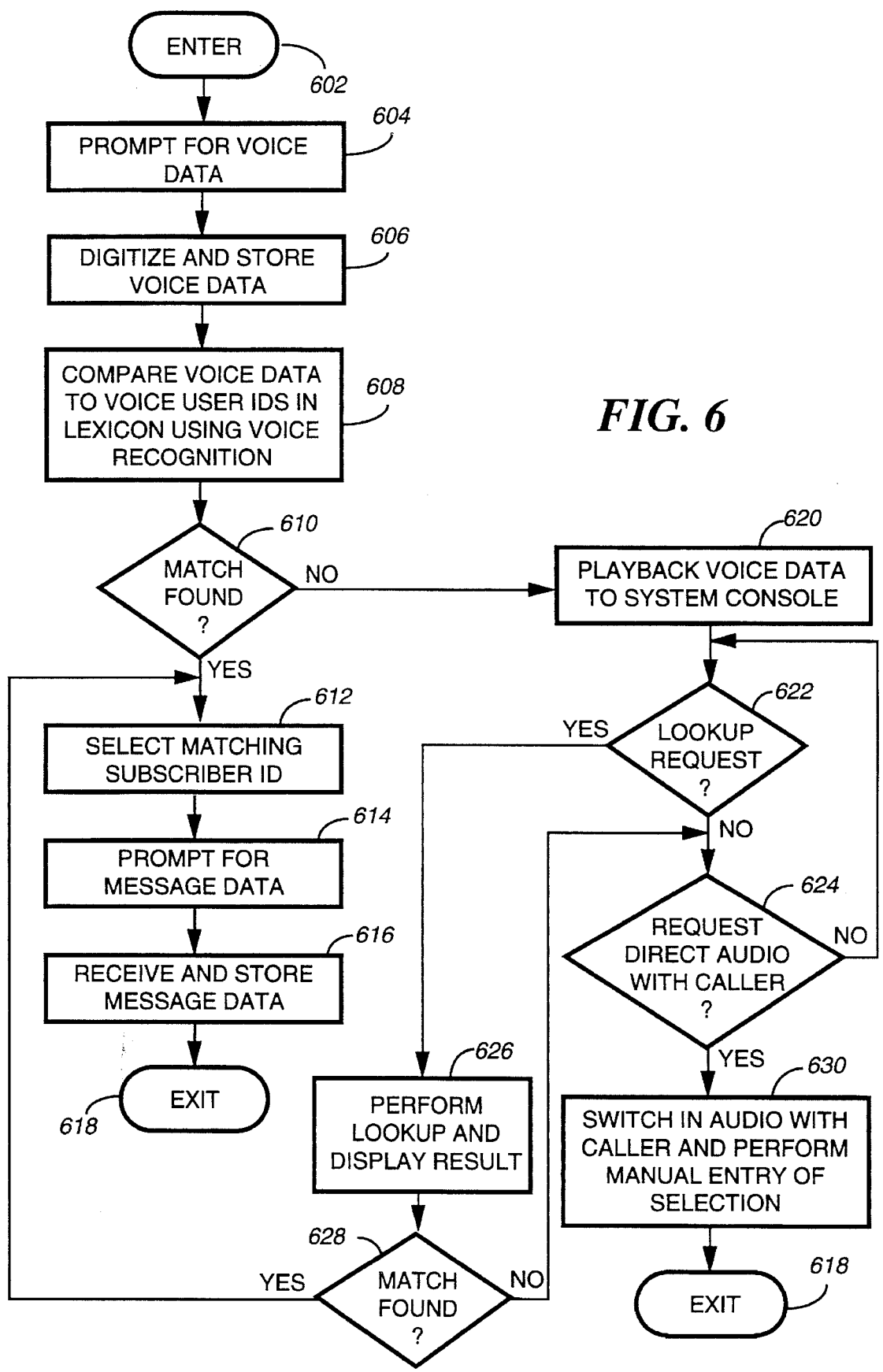
FIG. 6 is a flow diagram illustrating a second operation of the selective call terminal in FIG. 1, in accordance with a preferred embodiment of the present invention.

Referring to FIG. 6, a flow diagram illustrates an exemplary process for the system 100 for processing requests for sending selective call messages from callers 101. The system 100 enters 602 this process by prompting a caller 101 to speak the caller's selection of a Voice User Id corresponding to a subscriber ID for the system 100. The system 100 then digitizes and stores 606 a voice data received from the caller 101. The speech recognizer 136 performs voice recognition to compare the voice data to the Voice User IDs in the lexicon 134. The speech decision controller 138 then decides, at step 610, whether a match is found.

If a match was found, then the controller 106 selects the corresponding subscriber ID 202 from the database 132. The system 100 then, at step 614, prompts the caller 101 to enter message data. This can be handled, for example, by using conventional DTMF signaling from the caller's telephone device. Once the system 100 receives and stores, at step 616, the caller's message data, it couples the message data with a pager address 204 corresponding to the subscriber ID 202 to store a message in the message memory 120. The system 100 can then, at step 618, process the message stored in the message memory 120 to encode and transmit the message to one or more recipient remote devices 128.

On the other hand, if the speech decision controller 138 could not find a match, at step 610, then the controller 106 would activate the speech playback unit 118 to playback the caller's voice data for an operator at the system console 108. If the console 108 detects 622 a lookup request from the operator then the system 100 performs 626 a lookup on the database 132 and displays the result of the lookup to the operator at the console 108. The operator can select a found subscriber ID at the console indicating that a match was found, at steps 628 and 612. Then, as discussed before, the system 100 receives and processes the caller's message data, and transmits the selective call message, at steps 614, 616, and 618.

Lastly, if, after activating 620 the speech playback unit 118 to playback the caller's voice data for the operator at the system console 108, the operator can not understand the audible voice data, the operator can request 624 at the console 108 to switch in direct audio with the caller 101. The system 100 then connects 630 the caller 101 with the operator at the console 108 to manually process the entry of the selection. After accepting the caller's selection of a subscriber ID, and optionally also receiving message data from the caller 101, the system 100 then couples the pager address 204 with the received message data to store a message in the message memory 120. The system 100 then processes, at step 618, the message to transmit the message to the one or more selected remote units 128.

What is claimed is:

1. A selective call communication system comprising:

a database memory for storing a database associating a speech Voice User ID to a subscriber ID for one or more subscribers of the selective call communication system;

a lexicon memory for storing a lexicon including at least one speech Voice User ID that is associated with a subscriber ID for the one or more subscribers of the selective call communication system;

a monitor, coupled to the database memory and to the lexicon memory, for monitoring user system statistics for the selective call communication system and accumulating the user system statistics in the database, the monitor further defining the lexicon in the lexicon memory for including in the lexicon the at least one speech Voice User ID based on the accumulated user system statistics to determine a subset of the more active subscribers, rank ordering the one or more subscriber IDs according to the user system statistics, and grouping a set of the rank ordered one or more subscriber IDs to include at least one speech Voice User ID in the lexicon for voice data entry;

an input for receiving a voice data;

a controller, coupled to the input and to the lexicon memory, for comparing the voice data to the at least one speech Voice User ID in the lexicon for determining a match between the voice data and one of the at least one speech Voice User ID of the lexicon, for selecting a subscriber ID associated with a matching speech Voice User ID for the selective call communication system, and for sending a selective call message to one or more recipient remote units corresponding to the selected subscriber ID; and a system console coupled to the controller and in response to the controller determining that no match is found between the voice data and the at least one speech Voice User ID of the defined lexicon, the controller routing a call handling operation to the system console.

2. The selective call communication system of claim 1, further comprising:

a system console coupled to the controller and in response to the controller determining that no match is found between the voice data and the at least one speech Voice User ID of the defined lexicon, the controller routing a call handling operation to the system console for assistance by an operator.

3. The selective call communication system of claim 2, further comprising:

a speech playback unit, coupled to the system console and to the controller and response to the controller determining that no match is found between the voice data and the at least one speech Voice User ID of the defined lexicon, playing back the voice data at the system console for audible reception by an operator.

4. A paging system comprising:

a database memory for storing a database associating a speech Voice User ID to a subscriber ID for one or more subscribers of the paging system;

a lexicon memory for storing a lexicon including at least one speech Voice User ID that is associated with a subscriber ID for the one or more active subscribers of the paging system;

a monitor, coupled to the database memory and to the lexicon memory, for monitoring user system statistics for the paging system and accumulating the user system statistics in the database, the monitor further defining the lexicon in the lexicon memory for including in the lexicon the at least one speech Voice User ID based on the accumulated user system statistics to determine a subset of the more active subscribers, rank ordering the one or more subscriber IDs according to the user system statistics, and grouping a set of the rank ordered one or more subscriber IDs to include at least one speech Voice User ID in the lexicon for voice data entry;

a paging input for receiving a voice data for selecting a subscriber ID for the paging system;

a controller, coupled to the paging input and to the lexicon memory, for comparing the voice data to the at least one speech Voice User ID in the defined lexicon for determining a match between the voice data and one of the at least one speech Voice User ID of the defined lexicon, and for selecting a subscriber ID associated with a matching speech Voice User ID for the paging system;

a message memory coupled to the controller for storing a message including a pager address information associated with the selected subscriber ID;

an output controller for sending the message to one or more recipient paging units corresponding to the pager address information associated with the selected subscriber ID; and a system console coupled to the controller and in response to the controller determining that no match is found between the voice data and the at least one speech Voice User ID of the defined lexicon, the controller routing a call handling operation to the system console.

5. The paging system of claim 4, further comprising:

a system console coupled to the controller and in response to the controller determining that no match is found between the voice data and the at least one speech Voice User ID of the defined lexicon, the controller routing a call handling operation to the system console for assistance by an operator.

6. The paging system of claim 4, further comprising:

a speech playback unit, coupled to the system console and to the controller and in response to the controller determining that no match is found between the voice data and the at least one speech Voice User ID of the defined lexicon, playing back the voice data at the system console for audible reception by an operator.

7. A paging system comprising:

a database memory for storing a database associating a speech Voice User ID to a subscriber ID for one or more subscribers of the paging system;

a lexicon memory for storing a lexicon including at least one speech Voice User ID that is associated with a subscriber ID for the one or more active subscribers of the paging system;

a monitor, coupled to the database memory and to the lexicon memory, for monitoring user system statistics for the paging system and accumulating the user system statistics in the database to determine a subset of the more active subscribers, rank ordering the one or more subscriber IDs according to the user system statistics, and grouping a set of the rank ordered one or more subscriber IDs to include at least one speech Voice User ID in the lexicon for voice data entry, the monitor further defining the lexicon in the lexicon memory for including in the lexicon the at least one speech Voice User ID based on the accumulated user system statistics;

a paging input for receiving a voice data for selecting a subscriber ID for the paging system;

a controller, coupled to the paging input and to the lexicon memory, for comparing the voice data to the at least one speech Voice User ID in the defined lexicon for determining a match between the voice data and one of the at least one speech Voice User ID of the defined lexicon, and for selecting a subscriber ID associated with a matching speech Voice User ID for the paging system;

a message memory coupled to the controller for storing a message including a pager address information associated with the selected subscriber ID;

a paging encoder, coupled to the message memory and to the controller, for encoding a message for sending the encoded message to one or more recipient paging units that correspond to the pager address information associated with the selected subscriber ID;

an output controller, coupled to the paging encoder and to the controller, for sending the encoded message to the one or more recipient paging units;

a system console coupled to the controller and in response to the controller determining that no match is found between the voice data and the at least one speech Voice User ID of the defined lexicon, the controller routing a call handling operation to the system console for assistance by an operator; and a speech playback unit, coupled to the system console and to the controller and in response to the controller determining that no match is found between the voice data and the at least one speech Voice User ID of the defined lexicon, playing back the voice data at the system console for audible reception by an operator.

* * * * *